United States Patent [19]

Tremper, III

[11] Patent Number: 4,740,566

[45] Date of Patent: Apr. 26, 1988

[54] HIGH GLOSS COLOR KEYED GUIDE COAT

[75] Inventor: Henry S. Tremper, III, Clayton, N.J.

[73] Assignee: E. I. Du Pont de Nemours and Company, Wilmington, Del.

[21] Appl. No.: 866,470

[22] Filed: May 23, 1986

[51] Int. Cl.$^4$ .............................................. C08L 63/00
[52] U.S. Cl. ..................... 525/438; 523/400; 523/455; 525/443; 525/510; 525/519; 428/413; 428/418
[58] Field of Search ............ 525/438, 443, 510, 519, 525/533; 523/455, 400; 428/418

[56] References Cited

U.S. PATENT DOCUMENTS

| | | | |
|---|---|---|---|
| 3,553,284 | 1/1971 | Riemhofer et al. | 260/850 |
| 3,985,664 | 10/1976 | Sakaguchi et al. | 252/62.1 R |
| 4,042,539 | 8/1977 | Fanning | 524/432 |
| 4,101,496 | 7/1978 | Dorffel et al. | 260/31.2 R |
| 4,138,522 | 2/1979 | Ishizuka et al. | 428/195 |
| 4,169,825 | 10/1979 | Yapp et al. | 525/438 X |
| 4,178,319 | 12/1979 | Chattha | 525/188 |
| 4,180,610 | 12/1979 | Verma | 428/216 |
| 4,205,115 | 5/1980 | Piccirilli et al. | 428/334 |
| 4,315,053 | 2/1982 | Poth et al. | 428/423.7 |
| 4,316,940 | 2/1982 | Thornley | 428/413 |
| 4,343,925 | 8/1982 | Chang et al. | 525/440 |
| 4,363,908 | 12/1982 | Joyner et al. | 528/302 |
| 4,481,351 | 11/1984 | McConnell et al. | 528/272 |
| 4,517,255 | 5/1985 | Kanda et al. | 428/626 |
| 4,532,177 | 7/1985 | Mahar | 428/328 |
| 4,535,132 | 8/1985 | Ambrose et al. | 525/443 |

*Primary Examiner*—Theodore E. Pertilla
*Attorney, Agent, or Firm*—Hilmar L. Fricke

[57] ABSTRACT

A thermosetting high gloss color-keyed primer-surfacer comprises 50–70% by weight of a film-forming component consisting essentially of, by weight, 40–70% of a polyester polyol formed by reaction of dimethyl 1,4-dicyclohexanedicarboxylate, dicarboxylic acids, and branched-chain glycols; 20–40% of an aminoplast resin; and 5–10% of an epoxy resin.

19 Claims, No Drawings

HIGH GLOSS COLOR KEYED GUIDE COAT

BACKGROUND OF THE INVENTION

The present invention relates generally to coating compositions and particularly to a polyester based thermosetting primer-surfacer composition having low volatile organic content.

Primer-surfacer compositions are employed in the automobile and truck manufacturing industry as one component of multicomponent vehicle finishes. In a typical vehicle finishing operation as presently practiced, an electrodeposited primer composition is applied to a metal substrate, which optionally can be pretreated by galvanizing or phosphatizing to impart corrosion resistance. A primer-surfacer composition is then applied over the electrodeposited primer, and serves to fill minor imperfections in the substrate and provide a smooth, even surface suitable for application of visible topcoats. Defects in the primer-surfacer layer are removed by sanding.

Following application of a primer-surfacer, a base coat of acrylic lacquer, acrylic dispersion, acrylic enamel, polyurethane enamel, alkyd enamel, or other pigmented coating composition is applied and cured. In most finish operations, a final layer of a clear coating composition is applied to enhance gloss, durability, and overall appearance of the resulting multicomponent vehicle finish.

Some typical sealer and primer compositions representative of the prior art in this area are disclosed by Barrett et al., U.S. Pat. No. 2,873,210, Swanson and Walus, U.S. Pat. No. 3,272,647, Jeffery et al., U.S. Pat. No. 3,505,269, Rohrbacher, U.S. Pat. No. 3,509,086, Sandstedt, U.S. Pat. No. 3,627,779, and Fanning, U. S. Pat. No. 4,042,539.

Use of a primer-surfacer composition which is color-keyed to the base coat enables better base coat coverage at given application levels, providing savings in material costs. In addition, more transparent base coats can be employed, which provide better appearance characteristics. Use of primer-surfacers having high gloss enables easier detection, and hence, correction, of surface imperfections during the finishing process.

New polyester-based flexible primer-surfacer compositions having excellent adhesion to metal and polymeric substrates, high solids, high gloss, and pigments for color keying are of significant interest to the automobile and truck manufacturing industries.

SUMMARY OF THE INVENTION

The present invention provides a high gloss color-keyed primer-surfacer composition comprising from 50–70% by weight of a film-forming component consisting essentially of, by weight,
(1) 40–70% of a polyester polyol formed by copolymerization of:
  (a) dimethyl 1,4-dicyclohexanedi-carboxylate;
  (b) one or more dicarboxylic acids; and
  (c) one or more branched-chain glycols of 2–8 carbon atoms;
(2) 20–40% of an aminoplast resin; and
(3) 5–10% of an epoxy resin.

DETAILED DESCRIPTION OF THE INVENTION

The primer-surfacer compositions of the present invention comprise as a film-forming component crosslinkable polyester polyols derived from dimethyl 1,4-dicyclohexanedicarboxylate, dicarboxylic acids, and branched-chain glycols, in addition to conventional aminoplast crosslinking or curing agents and epoxy resins. The compositions of the present invention cure at conventional curing temperatures to provide high gloss coatings. These compositions are designed to be applied over electroprimer, sanded where needed, and then topcoated with a colored base coat followed by a clear coat.

The film-forming component comprises 50–70 percent, preferably 50–60 percent, of the combined weight of the primer-surfacer composition.

The polyester polyol used in the present invention is a copolymer of 1,4-dicylcohexanedicarboxylic acid, one or more dicarboxylic acids, and one or more branched chain glycols or polyols having 4–8 carbon atoms.

The dicarboxylic acids employed in the polyester polyols used in this invention have the general formula

where R is aliphatic or aromatic. The most useful aliphatic acids are alkylene, vinylene, or cycloaliphatic.

Preferred acids where R is alkylene are those in which R has 2–10 carbons. Most preferred are succinic acid, glutaric acid, azelaic acid, dodecanoic acid, pimelic acid, and adipic acid. Of the foregoing, adipic acid is preferred. Preferred aromatic dicarboxylic acids are phthalic, isophthalic, terephthalic, uvitic, and cumitic acids, of which isophthalic is most preferred. It should be noted that lower alkyl mono- or di-esters of the foregoing acids, or anhydrides, can be employed with equivalent results. In this context, "lower alkyl" refers to alkyl radicals having 1–5 carbons. Examples include phthalic anhydride, maleic anhydride, tetrahydrophthalic anhydride, hexahydrophthalic anhydride, methyltetrahydrophthalic anhydride, methylhexahydrophthalic anhydride and trimellitic anhydride.

Preferably, mixtures of dicarboxylic acids are used wherein the mole ratio of aromatic to aliphatic dicarboxylic acids ranges from 2:1 to 6:1. A ratio of about 5:1 aromatic to aliphatic is most preferred.

The branched-chain glycol or polyol components used in preparing the polyester polyol can be any branched-chain glycol or polyol having 2–8 carbons. Typical glycols are ethylene glycol, propylene glycol, butylene glycol, and neopentyl glycol. However, neopentyl glycol and trimethylolpropane, and in particular, mixtures of neopentyl glycol and trimethylolpropane, are preferred for use in preparing compositions of the present invention.

The polyester polyol can be produced by charging the reactants, a suitable solvent, and optionally a reaction catalyst into a reaction vessel equipped with a condenser and an agitator. Useful solvents for this polymerization step include xylene, toluene, other substituted benzenes, napthalene, and substituted napthalenes. The reaction catalysts can be present in conventional amounts and include, for example, dibutyl tin oxide, dibutyl tin dilaurate, sulfuric acid, or a sulfonic acid.

The reaction mixture is heated to reflux, usually 100–300° C., and there maintained for a period of from 1–8 hours. During this period, the esterification products are withdrawn. The polyester reaction product should have a number average molecular weight of from 1000–2200 and a weight average molecular weight of from 2200–4400. Moreover, reactants should be chosen to provide hydroxyl and acid values within preselected ranges. Hydroxyl groups are preferred to provide sites for cross-linking, and the number of acid groups is inversely related to humidity resistance. When the acid value is larger than about 20, the speed of reaction of the crosslinking agent with the hydroxyl groups is too high, and the adaptability to the coating operation is degraded.

In preparing the copolymers used in the present invention, acid values below 40, particularly in the range 0.1–20, are preferred. Hydroxyl values should be in the range 50–250 KOH mg/g. Preferably, hydroxyl values are in the range 100–250 KOH mg/g. If the hydroxyl value of the resin is smaller than 50, the speed of the reaction with the crosslinking agent is low, and if the hydroxyl value is larger than 250, the compatibility with other resins or the solvent solubility at the paint-forming step is degraded.

The film-forming component of the primer-surfacer compositions of the present invention also includes an aminoplast resin employed as a curing or cross-linking agent. Particularly useful are the alkylated products of aminoplast resins, wherein the resins are prepared by condensation of at least one aldehyde with at least one of urea, N,N-ethyleneurea, dicyandiamide, and aminotriazines such as melamines and guanamines. Among the aldehydes that are suitable are formaldehyde, revertable polymers thereof such as paraformaldehyde, acetaldehyde, crotonaldehyde, and acrolein. Preferred are formaldehyde, and revertable polymers thereof. The aminoplast resins can be alkylated with at least one and up to six alkanol molecules containing 1–6 carbon atoms. The alkanols can be straight-chain, branched, cyclic, or mixtures of these. Preferred are aminoplast resins that have been alkylated with methanol or butanol, especially butanol. Most preferred are butylated melamine-formaldehyde resins. These liquid cross-linking agents can have substantially 100% nonvolatile content as measured by the foil method at 45° C. for 45 minutes. For purposes of this invention it is important not to introduce extraneous diluents that would lower the final solids content of the primer-surfacer composition.

The aminoplast resin is present at about 20–40% by weight of the film-forming components of the final coating composition.

The coating compositions of the present invention also comprise an epoxy resin. Epoxy resins, often referred to simply as "epoxies", are generally known and are prepared by well known techniques. They are compounds or mixtures of compounds containing at least one, but typically more than one, 1,2-epoxy group of the formula

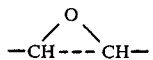

i.e., polyepoxides. The polyepoxides may be saturated or unsaturated, aliphatic, cycloaliphatic, aromatic or heterocyclic. Examples of suitable polyepoxides include the generally known polyglycidyl ethers of polyphenols and/or polyepoxides which are acrylic resins containing pendant and/or terminal 1,2-epoxy groups. Polyglycidyl ethers of polyphenols may be prepared, for example, by etherification of a polyphenol with epichlorohydrin or dichlorohydrin in the presence of an alkali. Examples of suitable polyphenols include 1,1-bis(4-hydroxyphenyl)ethane; 2,2-bis(4-hydroxyphenyl)propane; 1,1-bis(4-hydroxyphenyl)isobutane; 2,2-bis(4-hydroxytertiarybutylphenyl)propane; bis(2-hydroxy-1,5-dihydroxynaphthalene; 1,1-bis(4-hydroxy-3-allylphenyl)ethane; and hydrogenated derivatives thereof. The polyglycidyl ethers of polyphenols of various molecular weights may be produced, for example, by varying the mole ratio of epichlorohydrin to polyphenol in known manner. Epoxy resins also include the polyglycidyl ethers of mononuclear polyhydric phenols such as the polyglycidyl ethers of resorcinol, pyrogallol, hydroquinone, and pyrocatechol. Epoxy resins also include the polyglycidyl ethers of polyhydric alcohols such as the reaction products of epichlorohydrin or dichlorohydrin with aliphatic and cycloaliphatic compounds containing from two to four hydroxyl groups including, for example, ethylene glycol, diethylene glycol, triethylene glycol, dipropylene glycol, tripropylene glycol, propane diols, butane diols, pentane diols, glycerol, 1,2-hexanetriol, pentaerythritol, and 2,2-bis(4-hydroxycyclohexyl)propane. Epoxy resins additionally include polyglycidyl esters of polycarboxylic acids such as the generally known polyglycidyl esters of adipic acid, phthalic acid, and the like. In addition, polymerized resins containing epoxy groups may also be employed. These polyepoxides may be produced by the addition polymerization of epoxy functional monomers such as glycidyl acrylate, glycidyl methacrylate and allyl glycidyl ether optionally in combination with ethylenically unsaturated monomers such as styrene, alpha-methyl styrene, alpha-ethyl styrene, vinyl toluene, t-butyl styrene, acrylamide, methacrylamide, acrylonitrile, methacrylonitrile, ethacrylonitrile, ethyl methacrylate, methyl methacrylate, isopropyl methacrylate, isobutyl methacrylate, and isobornyl methacrylate. Many additional examples of epoxy resins are described in the *Handbook of Epoxy Resins*, Henry Lee and Kris Neville, 1967, McGraw Hill Book Company.

The polyester polyol, aminoplast resins, and epoxy resin components are normally each in solution after preparation and are suitable for direct use to form the primer-surfacer composition of this invention by blending with each other. The final composition contains 50–70% by weight of the film-forming component blend and 30–50% by weight of a solvent for the blend, these percentages being based upon the combined weight of the blend and solvent. One of the useful aspects of the present invention is that it can be conveniently applied even at these high weight-solids levels.

Additionally, coating compositions of the invention, depending on the type of crosslinkable resins employed, can contain a suitable catalyst to enhance the cure of the coating composition. Suitable catalysts include those customarily employed to promote crosslinking between hydroxy-functional polyesters and aminoplasts and epoxy resins.

Examples of typical catalysts which can be employed in coating compositions of the invention include organic sulfonic acids such as paratoluenesulfonic acid, stannous octoate, dibutyltin dilaurate, naphthalene sulfonic acid, naphthalene disulfonic acid, the organic esters of the sulfonic acids, and the like. Preferred are paratoluenesulfonic acid and dinonylnaphthalenesulfonic acid. The sulfonic acids can be neutralized with an amine, preferably a tertiary amine.

Any of the conventional solvents or blends of solvents can be used to form the composition of this invention provided that the selection of solvents is such that the polymeric constituents are compatible and give a high quality primer-surfacer. The following are examples of solvents which can be used to prepare the composition: methylethyl ketone, methylamyl ketone, methyl isobutyl ketone, toluene, acetone, xylene, isopropanol, ethylene glycol monoethyl ether acetate, and other esters, ethers, ketones and aliphatic, cycloaliphatic and aromatic hydrocarbon solvents.

A variety of pigments, organic dyes and lakes can be utilized in the composition of this invention. Examples of the useful pigments are: metallic oxides, such as titanium dioxide, iron oxide, zinc oxide and the like; metal hydroxides, metal powders, sulfides, sulfates, carbonates, silicates such as aluminum silicate, carbon black, talc, china clay, barytes, iron blues, lead blues, organic reds and organic maroons and the like. One particularly preferred combination of pigments which provides a high quality primer-surfacer composition having a neutral grey color is a mixture of titanium dioxide and carbon black.

Pigments can be introduced into the compositions of the invention by first forming a mill base with the polyester polyol. The mill base can be formed, for example, by conventional sand-grinding or ball-milling techniques, and then can be blended, by simple stirring or agitation, with the other constituents of the coating composition.

In addition to the essential components described above, compositions within the scope of the present invention can also include flow control agents, drying oils, and fillers. Flow control agents, for example, include polymers such as polyalkyl acrylates and methacrylates (e.g. Resiflow® L, available from the SBS Chemical Company), fluorinated polymers such as fluorinated esters of polyethylene glycol or polypropylene glycol, ethyl cellulose, silcones usch as dimethyl polysiloxane or methyl phenyl polysiloxanes, or mixtures of silica and polyvinylpyrrolidone.

Drying oils, which can be present up to about 15 percent by weight (based on binder only) include castor oil, tung oil, soya oil, linseed oil, and other suitable equivalents.

The primer-surfacer composition of this invention has excellent adhesion to a variety of pigmented primer coatings, such as alkyd primer coatings, alkyd/epoxy primer coatings, acrylic primer coatings, acrylic/epoxy primer coatings, nitrocellulose primer coatings and the like. Powder primer coatings can also be used. Also, the novel composition has excellent adhesion to plastics, such asacrylonitrile/butadiene/styrene plastics, fiberglass reinforced polyester, aluminum, untreated steel or treated steel, such as phosphatized steel or galvanized stee, and excellent adhesion to a variety of topcoats, such as alkyd or or acrylic enamels, polyurethane enamels, acrylic lacquers and acrylic dispersion lacquers.

The substrate is prepared by filing and sanding and then the novel composition of this invention is applied over the substrate by any of the conventional application methods, such as spraying, electrostatic spraying, dipping, brushing, flowcoating, and the like.

The composition can be cured by baking at 120° to 200° C. for 10-30 minutes.

Generally, the thickness of the dried primer-surfacer coat is 0.1-10 mils, and preferably about 0.5-2.0 mils. The primer-surfacer fills in minor imperfections in the substrate and can easily be sanded to form a smooth surface.

The following example illustrates particular aspects of the present invention.

EXAMPLE

A polyester polyol composition is prepared from the following ingredients, listed below in parts by weight:

| 1. Polyester Polyol Solution | |
| --- | --- |
| Dimethyl 1,4-cyclohexanedicarboxylate | 23.40 |
| Isophthalic Acid | 25.88 |
| Adipic Acid | 5.68 |
| Neopentyl Glycol | 36.16 |
| Trimethylolpropane | 8.87 |
| Dibutyltindilaurate/p-toluenesulfonic acid | 0.3 |
| Toluene | 1.7 |

The foregoing ingredients are charged into a reaction vessel equipped with an agitator and vapor condenser, and then heated slowly to reflux. The reflux condition is maintained until the reaction is completed, which is determined by monitoring the flow of water of esterification from the condenser. The mixtures is then cooled to about 80° C., agitated for one hour, and then filtered. The resulting polyester polyol has a hydroxyl value of about 150, an acid number of about 15, and a number average molecular weight from about 1000 to 2200 as determined by gel permeation chromatography. Solids content of this preparation is reduced to about 80%.

A mill base is then prepared by mixing the following ingredients (listed below in parts by weight) and grinding in a ball mill at about 60-70° C. for 30,000 cycles:

| 2. Mill Base | |
| --- | --- |
| Polyester Polyol Solution (Ingredient 1) | 12.64 |
| Butylated Melamine/formaldehyde resin (Resimene ® RS-466 from Monsanto Company) | 8.13 |
| Methylamyl ketone | 7.80 |
| TiO$_2$ White Pigment | 69.28 |
| Carbon Black Pigment | 0.15 |

A primer-surfacer is then prepared from the following ingredients:

| Portion 1 | |
| --- | --- |
| Mill Base (Ingredient 2) | 141.13 |
| Acrylic Terpolymer Flow Agent (Resiflow ® L) | 3.43 |
| Portion 2 | |
| Polyester Polyol Solution (Ingredient 1) | 338.02 |
| Epoxy Resin (Epon ® 1001) | 45.58 |
| Butylated Melamine/formaldehyde resin (Resimene ® RS-466 from Monsanto Company) | 243.55 |
| Butylcellosolve acetate | 9.80 |
| Mixed methylester of $C_6$-$C_9$ diacids | 9.80 |
| Methylamyl ketone | 91.45 |
| Portion 3 | |
| Methylamyl ketone | 30.24 |

Portion 1 is charged into a steel vessel equipped with a mixing blade and mixed for 2 hours. Portion 2 is then added, and mixing continued for an additional 2 hours. At this point, the viscosity is checked and Portion 3 added, if needed, to provide a Fisher #3 viscosity from 38–48 seconds.

The resulting primer surfacer composition has a gallon weight of about 9.13 pounds, and consists of about 64.4% by weight solids. The composition is then sprayed onto a 12 by 16 inch Uniprime coated steel test panel and baked at 135° C. for 30 minutes. The resulting coating has a pencil hardness of 2H, a 20 degree gloss of at least 80 unites, and excellent adhesion to both substrate and subsequently applied topcoats.

What is claimed is:

1. A high gloss color-keyed primer-surfacer composition comprising solvents, pigments, and from 50–70% by weight of a film-forming component consisting essentially of, by weight,
   (1) 40–70% of a polyester polyol formed by copolymerization of:
      (a) dimethyl 1,4-dicyclohexanedicarboxylate;
      (b) one or more dicarboxylic acids; and
      (c) one or more branched-chain glycols of 2–8 carbon atoms;
   (2) 20–40% of an aminoplast resin; and
   (3) 5–10% of an epoxy resin having at least one 1,2 epoxy group of the formula

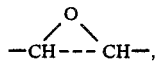

2. A composition according to claim 1, wherein the film forming component comprises from 50–60% by weight of the composition.

3. A composition according to claim 2, wherein the film forming component consists essentially of, by weight,
   (1) 55–65% of a polyester polyol formed by copolymerization of:
      (a) dimethyl 1,4-dicyclohexanedicarboxylate;
      (b) one or more dicarboxylic acids; and
      (c) one or more branched-chain glycols of 2–8 carbon atoms;
   (2) 30–40% of an aminoplast resin; and
   (3) 5–10% of an epoxy resin.

4. A composition according to claim 3, wherein the branched chain glycols are selected from the group consisting of ethylene glycol, propylene glycol, butylene glycol, neopentyl glycol and trimethylolpropane.

5. A composition according to claim 4, wherein the dicarboxylic acids are a mixture of aromatic and aliphatic dicarboxylic acids selected from the group consisting of succinic acid, glutaric acid, azelaic acid, dodecanoic acid, pimelic acid, adipic acid, phthalic acid, isophthalic acid, terephthalic acid, uvitic acid, and cumitic acid.

6. A composition according to claim 5, wherein the polyester polyol is formed by copolymerization of dimethyl 1,4-dicyclohexanedicarboxylate, isophthalic acid, adipic acid, neopentyl glycol, and trimethylolpropane.

7. A composition according to claim 6, wherein isophthalic acid and adipic acid are present in the polyester polyol at a mol ratio from about 2:1 to about 6:1.

8. A composition according to claim 7, wherein isophthalic acid and adipic acid are present in the polyester polyol at a mol ratio from about 5:1.

9. A composition according to claim 8, wherein the aminoplast resin is a butylated melamine-formaldehyde resin.

10. A high gloss primer-surfacer composition comprising solvents, pigments and and 50–70% by weight of a film forming component consisting essentially of, by weight,
    (1) 40–70% of a polyester polyol formed by copolymerization of:
       (a) dimethyl 1,4-dicyclohaxanedicarboxylate;
       (b) isophthalic and adipic acids at a mol ratio from about 2:1 to 6:1 and
       (c) neopentyl glycol and trimethylolpropane;
    (2) 20–40% of butylated melamine formaldehyde resin;
    (3) 5–10% of an epoxy resin of epichlorohydrin and bisphenol-A.

11. A composition according to claim 10, additionally containing pigments.

12. A composition according to claim 11, additionally containing up to 15% by weight castor oil.

13. A substrate coated with a cured coating composition according to claim 1.

14. A substrate coated with a cured coating composition according to claim 7.

15. A substrate coated with a cured coating composition according to claim 9.

16. A substrate coated with a cured coating composition according to claim 10.

17. A substrate coated with a cured coating composition according to claim 11.

18. A substrate coated with a cured coating composition according to claim 12.

19. A substrate coated with a cured coating composition according to claim 13.

* * * * *